United States Patent
Colon-Mercado et al.

(10) Patent No.: US 10,490,825 B2
(45) Date of Patent: Nov. 26, 2019

(54) NON-PLATINUM GROUP OXYGEN REDUCTION REACTION CATALYSTS

(71) Applicant: Savannah River Nuclear Solutions, LLC, Aiken, SC (US)

(72) Inventors: Hector R. Colon-Mercado, Aiken, SC (US); Mark C. Elvington, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 0 days.

(21) Appl. No.: 15/370,152

(22) Filed: Dec. 6, 2016

(65) Prior Publication Data

US 2018/0159141 A1  Jun. 7, 2018

(51) Int. Cl.
*H01M 4/90* (2006.01)
*H01M 8/1004* (2016.01)
*H01M 8/1018* (2016.01)

(52) U.S. Cl.
CPC ....... *H01M 4/9008* (2013.01); *H01M 8/1004* (2013.01); *H01M 2008/1095* (2013.01)

(58) Field of Classification Search
None
See application file for complete search history.

(56) References Cited

U.S. PATENT DOCUMENTS

| | | |
|---|---|---|
| 7,880,026 B2 | 2/2011 | Ni et al. |
| 8,329,769 B2 | 12/2012 | Kang et al. |
| 8,580,704 B2 | 11/2013 | Lefevre et al. |
| 8,623,928 B2 | 1/2014 | Du et al. |
| 8,674,128 B2 | 3/2014 | Yaghi et al. |
| 8,809,409 B2 | 8/2014 | Cooper et al. |
| 8,835,343 B2 | 9/2014 | Liu et al. |
| 8,852,320 B2 | 11/2014 | Yaghi et al. |
| 9,180,443 B1 | 11/2015 | Serov et al. |
| 9,249,120 B2 | 2/2016 | Deng et al. |
| 9,269,473 B2 | 2/2016 | Yaghi et al. |
| 2011/0076598 A1* | 3/2011 | Chen ............... B01J 31/1616 429/527 |
| 2011/0281719 A1* | 11/2011 | Liu ...................... B01J 23/26 502/1 |
| 2013/0273461 A1 | 10/2013 | Liu et al. |

(Continued)

FOREIGN PATENT DOCUMENTS

CN  101270094 B  8/2010
CN  103877948    6/2014

(Continued)

OTHER PUBLICATIONS

Barkholtz, et al.; "Highly Active Non-PGM Catalysts Prepare from Metal Organic Frameworks," *Catalysts* (2015) 5, pp. 955-965.

(Continued)

*Primary Examiner* — Christopher P Domone
(74) *Attorney, Agent, or Firm* — Dority & Manning, P.A.

(57) ABSTRACT

Methods for producing non-platinum group metal electrocatalysts effective for the reduction of oxygen in fuel cells and other electrochemical reactions and electrocatalysts as may be produced by these methods are described. The electrocatalysts can be formed according to low to medium temperature formation methods and may be particularly attractive for use in low-temperature fuel cells.

24 Claims, 1 Drawing Sheet

(56) References Cited

U.S. PATENT DOCUMENTS

| | | | |
|---|---|---|---|
| 2014/0148596 A1* | 5/2014 | Dichtel | B01J 20/22 540/465 |
| 2015/0295248 A1 | 10/2015 | Serov et al. | |
| 2015/0318557 A1 | 11/2015 | Serov et al. | |
| 2015/0340705 A1 | 11/2015 | Tylus et al. | |

FOREIGN PATENT DOCUMENTS

| | | |
|---|---|---|
| CN | 105061757 | 11/2015 |
| CN | 105348303 A | 2/2016 |
| CN | 105642353 A | 6/2016 |
| WO | WO2011035064 | 3/2011 |
| WO | WO201342073 A1 | 3/2013 |
| WO | WO201540638 A1 | 3/2015 |
| WO | WO201549318 A1 | 4/2015 |
| WO | WO2015142954 A1 | 9/2015 |
| WO | WO2015150173 A1 | 10/2015 |
| WO | WO2015157239 A1 | 10/2015 |
| WO | WO2015195179 A2 | 12/2015 |
| WO | WO201628434 A1 | 2/2016 |

OTHER PUBLICATIONS

Cooper; "Conjugated Microporous Polymers," *Adv. Materials* (2009) 21, pp. 1291-1295.

Gandara, et al.; "Porous, Conductive Metal-Triazolates and Their Structural Eludication by the Charge-Flipping Method," *Chem. Eur. J.* (2012), 8 pages.

Othman, et al.; "Non precious metal catalysts for the PEM fuel cell cathode," *Intl. J. Hydrogen Energy* (2012) pp. 357-372.

Wang; "Recent development of non-platinum catalysts for oxygen reduction reaction," J. Power Sources (2005) 152, pp. 1-15.

Xu, et al.; "Radical Covalent Organic Frameworks: A General Strategy to Immobilize Open-Accessible Polyradicals for High-Performance Capacitive Energy Storage,"*Angew. Chem. Int. Ed.* (2015) 54, pp. 6814-6818.

Cheon, et al. "Ordered mesoporous porphyrinic carbons with very high electrocatalytic activity for the oxygen reduction reaction" Sci. Reports 3:2715 (2013) pp. 1-8.

Strickland, et al. "Highly active oxygen reduction non-platinum group metal electrocatalyst without direct metal-nitrogen coordination" Nature Commun. 6:7343 (2015) pp. 1-8.

Xu, et al. "Conjugated microporous polymers: Design, synthesis and application" Chem. Soc. Rev. 42 (2013) pp. 8012-8031.

Zhao, et al. "Highly Efficient Non-Precious Metal Electrocatalysts Prepared from One-Pot Synthesized Zeolitic Imidazolate Frameworks" Adv. Mater. 26 (2014) pp. 1093-1097.

\* cited by examiner

NON-PLATINUM GROUP OXYGEN REDUCTION REACTION CATALYSTS

STATEMENT REGARDING FEDERALLY SPONSORED RESEARCH OR DEVELOPMENT

This invention was made with Government support under Contract No. DE-AC09-08SR22470 awarded by the United States Department of Energy. The Government has certain rights in the invention.

BACKGROUND

Fuel cells that utilize renewable fuels and oxygen (or hydrogen peroxide) as oxidant are environmentally friendly devices that generate electricity and water as the products of the oxygen reduction reaction (ORR), and as such these fuel cells don't produce the toxic reaction products produced by other more traditional energy sources. Polymer electrolyte membrane fuel cells (PEMFCs), a type of fuel cell being developed for several applications including automotive, require electrocatalysts to oxidize hydrogen at the anode and to reduce oxygen to water at the cathode through the ORR thereby providing desirable current. Expensive conventional catalysts, such as platinum and platinum based materials, result in high manufacturing and production costs. For instance, the manufacturing costs of the fuel cell electrodes for an electrically powered car were estimated in 2006 to be $50-$100 per kW. For an electrically powered car with a power output of, e.g., 80 kW, manufacturing costs of $4000-$8000 for the electrodes alone can be expected.

In an effort to maintain or improve current density outputs of fuel cells while decreasing production costs, attempts have been made to replace platinum based electrocatalysts of the ORR with cost-effective non-platinum group metal (non-PGM) catalysts. Non-PGM catalysts incorporating transition metals such as iron and cobalt are among the possible candidates. These catalysts are active toward the ORR and exhibit selectivity toward the four electron oxygen reduction pathway.

Early non-PGM catalyst research has focused on materials produced by pyrolyzing metal-N4 macrocyles adsorbed on carbon black in an inert atmosphere. Electrocatalysts for the ORR have also been developed by pyrolyzing a metal precursor (e.g., cobalt acetate), carbon black and a nitrogen precursor such as polyacrylonitrile in inert atmosphere. More recently, chelating agents have been encapsulated within the cage structure of a metal organic framework (MOF) which is subsequently thermally treated to remove the metal node. The heat treatment transforms the structure into a conductive and highly active carbon catalyst structure while maintaining or enhancing porosity. Unfortunately, methods that have been developed thus far to prepare non-PGM catalysts require multiple synthesis and processing steps such as polymerization reactions with or without sacrificial templating materials, acid leaching, or formation of complex precursor materials. These methods also include one or more high temperature processing steps sometimes including acid leaching between thermolysis steps.

What are needed in the art are low cost electrocatalyst materials for the ORR that do not require the inclusion of any precious metals, i.e., non-PGM ORR electrocatalysts. Moreover, what are needed are economical formation methods for the electrocatalysts. For instance, a single-step formation process for a conductive microporous support that includes accessible active sites in the support structure would be of great benefit. Additionally, a low temperature formation process for non-platinum group metal oxygen reduction reaction electrocatalysts would be of great benefit.

SUMMARY

According to one embodiment, disclosed is a method for forming an oxygen reduction reaction (ORR) electrocatalyst. The method can include reacting monomers in a melt in the presence of a Lewis acid catalyst to form a three dimensional polymeric framework. In one embodiment the method can be an ionothermal synthesis process in which the Lewis acid functions as the solvent as well as the catalyst. Monomers used to form the electrocatalyst can include at least one π-conjugated moiety and upon reaction the polymerized monomers can form a π-conjugated, microporous, 3-dimensional polymeric framework. Linkages formed between the monomers upon the reaction can include at least one heteroaryl group that contain at least one nitrogen heteroatom which is available to form a coordinate bond with a metal ion, such that multiple heteroaryl rings can form multidentate, metal chelating sites.

The method can also include complexing a metal ion within the framework at the chelating sites. In particular, the metal ion can be a non-PGM ion configured for use as an active site in an oxygen reduction reaction. The electrocatalyst may optionally include additional chelates to modulate the electrocatalytic activity for an ORR.

A method for forming an electrocatalytic structure is disclosed that can include locating the electrocatalyst thus formed in functional contact with another component. For instance, a method can include locating the electrocatalyst in electrical communication with an electrode current collector and in ionic communication with an ion-conducting electrolyte, and in particular embodiments, with a proton-conducting or a hydroxyl ion-conducting electrolyte. In one embodiment, the formation process can be carried out entirely at low to medium temperature, for instance, at about 400° C. or less.

Also disclosed are ORR electrocatalytic structures that include the electrocatalysts. For instance, an electrocatalyst can include a three dimensional framework, e.g., either a π-conjugated microporous polymer (CMP) or a covalent organic framework (COF), that includes crosslinked monomers and linkages, at least a portion of which including at least one heteroaryl group that in turn includes at least one nitrogen heteroatom. The framework can be complexed with a non-PGM metal ion such as iron, cobalt, nickel, etc. that can function as a catalytically active site for the ORR. For instance, a metal ion can be held in the framework via coordinate bonds with a nitrogen-containing chelating ligand. In particular embodiments, a monomer can contain preformed bidentate chelating sites such as 2,2'-bipyridine or 1,10-phenanthroline. In particular embodiments, the heteroaryl linkages can include triazine rings or phenazine rings. In one embodiment, the electrocatalyst can be held in ionic communication with an ion-conducting electrolyte and in electrical communication with a current collector.

Devices (e.g., membrane electrode assemblies (MEAs)) are also disclosed that can that incorporate the ORR electrocatalysts. For instance, an MEA can include a first electrode that includes the electrocatalyst, an ion-conducting electrolyte in ionic communication with the electrocatalyst, and a second electrode held in ionic communication with the ion-conducting electrolyte. MEAs can be designed for use in low temperature fuel cells such as polymer electrolyte fuel cells, alkaline fuel cells, etc.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
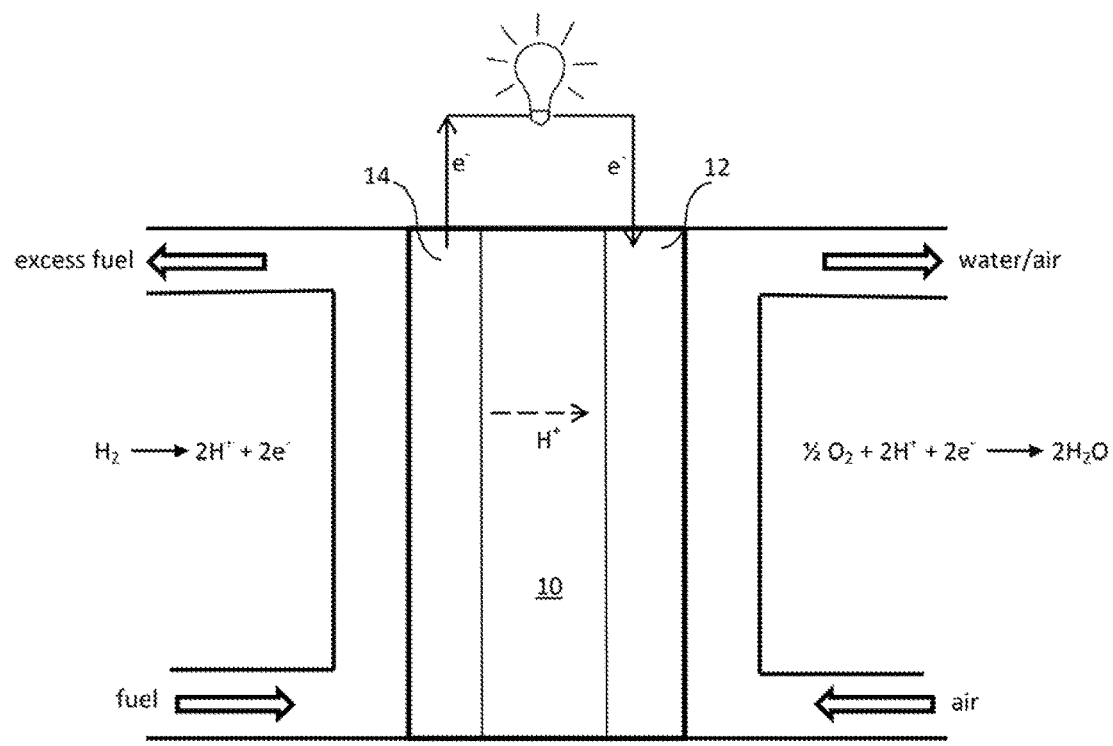
FIG. 1 schematically illustrates a proton conducting fuel cell as may incorporate an ORR electrocatalyst as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to methods for producing electrocatalysts for use in catalyzing electrochemical reactions. In one particular embodiment, the present disclosure is directed to methods for producing non-PGM electrocatalysts effective for the reduction of oxygen in fuel cells. Beneficially, the electrocatalysts can be formed according to low to medium temperature formation methods, which can further reduce production costs of the electrocatalysts. The electrocatalysts may be particularly attractive for use in low-temperature fuel cells, such as polymer electrolyte fuel cells.

The electrocatalysts can be based upon COF and CMP frameworks that include crosslinked monomers and/or linkages that can provide multidentate chelating sites for non-platinum group metal ions. The frameworks can be formed by use of precise molecular engineering so as to provide high electrical conductivity, controlled porosity, and high surface area. Moreover the three-dimensional (3-D) frameworks of the electrocatalysts can include a controllable and high concentration of chelating sites throughout the framework and can exhibit very high stability. The product electrocatalysts can be particularly useful when utilized for catalyzing the ORR in fuel cells, e.g., low temperature fuel cells that operate at about 200° C. or less.

The electrocatalysts can be produced by a relatively simple, low cost method that can include formation of the 3-D framework through polymerization of selected monomers to form desired linkages. Through predetermination of the particular monomers employed, the framework formation process can provide for the targeted production of functionality within the framework in a controlled fashion and can thereby likewise provide for precise control of characteristics of the product electrocatalysts (e.g., conductivity, metal ion density, micro/mesoporosity, etc.). Moreover, the formation process can be carried out at low to medium temperatures (at about 400° C. or less) and with fewer processing steps as compared to previously known non-PGM catalyst formation methods while reducing energy consumption which can further lower production costs associated with the electrocatalysts.

The electrocatalysts include a polymeric framework that can be formed through polymerization of selected monomers. Selected monomers can include at least one π-conjugated moiety (e.g., an alkyne, aryl or heteroaryl group). In addition, the monomers can be selected such that linkages formed between monomers upon polymerization can include at least one heteroaryl group that includes at least one nitrogen heteroatom serving as a coordination site. As such, multiple nitrogen heteroatoms (e.g., multiple heteroaryl rings) located within the monomers and/or in the linkage can form multidentate chelating sites for a metal ion suitable for use in catalyzing the ORR. For instance, a linkage group formed upon polymerization can include a phenazine, a triazine ring, or any other suitable nitrogen-containing heteroaryl groups, or a non-coordinating aryl group. A monomer can contain bidentate chelating sites such as are found in 2,2'-bipyridine or 1,10-phenanthroline. In addition, a monomer can provide all or part of aryl or nitrogen-containing heteroaryl groups formed in linkages of the crosslinked network.

As utilized herein, the term "aryl" used alone or as part of a larger moiety as in "aralkyl," "aralkoxy," or "aryloxyalkyl," refers to cyclic (e.g., monocyclic, bicyclic, or larger) ring systems, wherein at least one ring in the system is aromatic and wherein each ring in the system contains three to seven ring atoms. The term "aryl" may be used interchangeably with the term "aryl ring". In certain embodiments, "aryl" refers to an aromatic ring system which includes, but not limited to, phenyl, biphenyl, naphthyl, anthracyl and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

As utilized herein, the terms "heteroaryl" and "heteroar-," used alone or as part of a larger moiety, e.g., "heteroaralkyl," or "heteroaralkoxy," refer to groups having 5 to 10 ring atoms, for instance 5, 6, or 9 ring atoms; having 6, 10, or 14π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phonoxazinyl, tetrahydroquinolinyl, tetrahydroisoquinolinyl, and pyrido[2,3-b]-1,4-oxazin-3(4H)-one. The term "heteroaryl" may be used interchangeably with the terms "heteroaryl ring," "heteroaryl group," or "heteroaromatic". The term "heteroaralkyl" refers to an alkyl group substituted by a heteroaryl.

In one embodiment, the polymeric framework can include a π-conjugated microporous polymer (CMP). CMP's are synthetic amorphous networks that combine micro/mesoporosity with extended π-conjugation. CMP's generally have tunable pore sizes often around 2 nm in diameter or less, however pore diameters can be larger, for instance up to 8 nm or even greater in some embodiments. CMP's can exhibit exceptionally high surface area (e.g., up to about 6500 $m^2/g$), and in addition to the structural modularity, CMP's often exhibit excellent stability.

In another embodiment, the framework can include a covalent organic framework. COF's are synthetic networks that, similar to CMP's, combine controllable porosity with extended π-conjugation capable of exhibiting porosity and surface area in the same range as CMPs. COF's are generally crystalline or semi-crystalline, and are generally formed exclusively with relative light elements including hydrogen, boron, carbon, nitrogen and oxygen.

A CMP framework of an electrocatalyst can include phenazine ring linkages. For instance, a CMP framework can be formed via a condensation polymerization of monomers that include suitable functionality such that the polymerization process includes a phenazine ring fusion reaction. The phenazine ring fusion reaction can be used to form a CMP that includes a fused molecular skeleton containing the linkage ring throughout the framework via reaction of polyfunctional ketone monomer with polyfunctional conjugated amine monomer. For instance, the linkage formation can be carried out according to the general reaction scheme of:

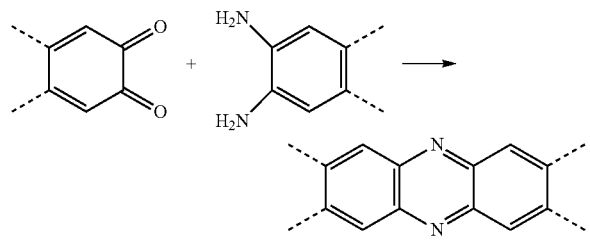

In which the dashed lines can represent the linkage connection to the remainder of the polymeric framework.

By way of example, in one embodiment, a CMP framework can be formed through polymerization of 1,2,4,5-benzenetetramine tetrachloride with hexaketocyclohexane to form a 3-D CMP product that includes phenazine ring linkages.

A COF can include triazine groups as the heteroaryl linkage group that includes nitrogen in the ring as a coordination site. Triazine linkage groups can be achieved by dynamic trimerization reaction of aromatic nitriles according to the following general reaction scheme:

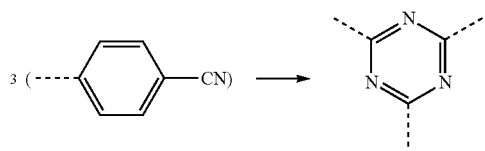

Monomers used in the polymerization reactions can be the same or different from one another. For instance, a triazine trimerization reaction can utilize nitrile functionalized aryl or heteroaryl monomers that can be the same or different from one another, and combinations of monomers with any suitable $C_2$, $C_3$, or $C_4$ geometry and structure or meta-substituted dicyanobenzene can be polymerized to provide a framework based on the triazine skeleton with a desired porosity. By way of example, 2,2'-bipyridine-5,5'-dicarbonitrile (DCBPy) can be polymerized, optionally in conjunction with a second monomer such as 3,8-dicyano-1,10-phenanthroline (DCPhen). These and other such monomers that can provide additional coordination sites in the conjugated systems can be utilized as can aromatic nitrile-containing monomers that do not include additional coordination sites, such as 1,1'-biphenyl-4-4'dicarbonitrile (DCBP). For instance, monomers that do not contain coordination sites (e.g. DCBP) can be combined with monomers that do contain coordination sites (e.g. DCBPy) in varying ratios, typically in the range from 9:1 to 1:1 in some embodiments, to modulate the active site density. Similarly, combinations of different polyfunctional ketones and/or different polyfunctional amines can be utilized to form the phenazine ring linkages of a CMP framework.

When utilizing combinations of different monomers in a polymerization reaction, the various monomers can be combined in suitable proportions, generally depending upon the particular monomers and reaction scheme as well as on the desired characteristics of the product framework. For instance, a polyfunctional aromatic amine and a polyfunctional cyclic ketone can be combined in a molar ratio of from about 2:1 to about 1:1, or about 1.5:1 in some embodiments, though variations of this range are possible. In particular, monomer ratios can be selected to provide desired physical, chemical, electronic and electrocatalytic properties to the electrocatalyst products.

COF's and CMP's for use as disclosed herein are not limited to the formation methods previously described, e.g. via a triazine trimerization reaction or phenazine ring fusion reaction respectively. Other polymerization methods as are known in the art can be utilized. By way of example, a COF or CMP that includes one or more heteroaryl groups incorporating at least one nitrogen that is available to form coordinate bonds, such that multiple nitrogen containing heteroaryl rings located within the monomer or in the linkage can form a chelating site for a metal ion suitable for use in catalyzing the ORR, can be formed by use of and without limitation, Suzuki cross-coupling reaction, Sonogashira reaction, Yamamoto reaction, cyclotrimerization of ethynyl derivatives, and oxidative coupling reaction. In one embodiment, a linkage can include aryl groups, such as benzene groups, that can be formed according to an alkynyl cyclotrimerization reaction.

Of course, the monomers used to form the framework are not limited to the specific monomers mentioned herein, and monomers can be selected to provide desired heteroaryl linkage, porosity, functionality and conductivity as is known in the art. For instance, the polyfunctional ketone monomer and/or the polyfunctional amine monomer of a phenazine ring formation reaction and the aromatic nitriles of a triazine trimerization reaction can include one or more aryl moieties, (including aralkyl, aralkoxy, and alyloxyalkyl groups), and/or one or more heteroaryl moieties (including heteroaralkyl and heteroaralkoxy groups), as well as other conjugated or non-conjugated moieties as are known in the art. In particular, longer or shorter monomers can be selected such that the framework thus formed will have larger or smaller pore diameter. For instance, a monomer can include one or more straight chain alkyne linkages as are known in the art and as may be beneficially utilized in developing desired porosity characteristics of the product framework.

The monomers can also optionally include additional components that can be utilized to increase the density of chelating sites in the polymeric framework beyond those provided by the polymerization reaction linkages. Thus, monomer selection can be utilized to provide precise control to characteristics of the framework. Additional CMPs, COFs, and monomers suitable for use in forming the frameworks and polymers are known in the art and have been disclosed, for instance in U.S. Pat. No. 9,269,473 to Yaghi, et al., which is incorporated herein by reference.

The frameworks can be formed in the melt by use of Lewis acid catalysts. Beneficially, in one embodiment, the frameworks can be formed in a melt reaction process at low to medium temperature, e.g., about 400° C. or less, or about 300° C. or less in some embodiments. However, a framework polymerization process is not limited to low temperature processing and higher temperatures, for instance up to about 1100° C., are encompassed herein. According to one exemplary melt polymerization process, the frameworks can be formed according to an ionothermal synthesis in which the Lewis acid can function as the solvent as well as the catalyst. As such, the Lewis acid catalyst can have a melting point below the polymerization reaction temperature set point and selection of the particular Lewis acid and the monomer to Lewis acid ratio can also provide a control parameter for design of certain framework characteristics.

Exemplary Lewis acid catalysts can include, without limitation, zinc chloride, iron chloride and aluminum chloride, though any suitable Lewis acid catalyst is encompassed, including those based on main group metals such as aluminum, boron, silicon, and tin, as well as those based upon early (titanium, zirconium) or late (iron, copper, zinc) d-block metals. The molar ratio of monomer to catalyst in a reaction can generally vary from about 1:5 to about 1:20, for instance about 1:10 in some embodiments.

As stated, the reaction can be carried out in the melt, with energy provided via any suitable source, e.g., a microwave energy source, a conventional thermal heat (e.g., infrared) source, etc. A microwave reaction vessel can be beneficial in some embodiments, as this route can shorten reaction time, and reduce the required energy input. In general, the monomers and catalyst/solvent can be combined under inert atmosphere and heated for a period of time to enable polymerization. Beneficially, a reaction process can produce little or no byproducts, with only polymer and a small amount of unreacted monomer remaining following the reaction period. A typical polymerization process can include heating the reaction mixture to the reaction temperature (e.g., about 300° C. to about 400° C.) and holding at the reaction temperature for a period of time (e.g., about 16 hours to about 48 hours), optionally at increased pressure (e.g., from about 10 bar to about 20 bar in some embodiments). The product can then be washed according to standard practice with water, hydrochloric acid, acetonitrile, etc. one or more times to purify the product and remove the Lewis acid and any unreacted monomer.

To provide the frameworks with the desired electrocatalytic activity, the coordinating and chelating sites of the framework can be complexed with a suitable metal ion. In particular, a metal ion can be a non-PGM that is suitable for use as an active site in an ORR. The metal can be a non-noble transition metal or a combination of metals. For example, the metal can be a 3d-transition metal or a combination thereof. In one embodiment, the metal can include iron, cobalt, nickel, copper, chromium, manganese or combinations thereof.

The complexation can be carried out according to any suitable process that can form coordinate bonds between a metal ion and a plurality of the nitrogen heteroatoms. For instance, a complex can be formed in one embodiment by simply refluxing the framework dispersion in a suitable solvent with a metal salt (e.g., iron(II)acetate, iron(II)chloride) at low temperature (generally less than 200° C. and in one embodiment 100° C. or less) for a period of time (generally from a few hours to several days, e.g., from about 16 hours to about seven days).

The relative amount of metal ion combined with the polymeric network can vary, with preferred amounts generally depending upon the concentration of chelating sites in the framework. In addition, a higher metal salt content may be included in a reflux composition so as to accelerate the complexation. For instance, molar ratio of polymeric framework to metal salt of about 1:100 can be used in some embodiments of a complexing reaction scheme.

The catalytic activity of a framework can be modulated by the inclusion of additional chelating ligands subsequent to the polymerization reaction. For instance, in one embodiment, this can be carried out by heating at low temperature (e.g. about 200° C. or less) the formed polymeric framework material in a dispersion containing chelating ligands that incorporate the desired functionality and thereby bonding the chelating ligands to the coordinated metals. For example, additional chelating functionality can be provided through reaction of ligands such as 2,2'-bipyridine or 1,10-phenantholine with a metal functionalized framework.

A framework can optionally include functionality in addition to the chelating sites provided within the crosslinked framework structure itself. For instance, a framework can include functionality that can provide additional coordination functionality (e.g., pendant to the crosslinked framework) or that can be utilized for other purposes, for instance to improve adherence of the framework to other structures or materials of a device. For example, a framework can include reactive functionality to improve adherence to a current collector, to an electrode binder or to an electrolyte utilized in conjunction with the electrocatalyst in a fuel cell. Such functionality can include, without limitation, acrylate functionality, methacrylate functionality, carboxylic acid functionality, epoxy functionality, alcohol functionality, isocyanates functionality, halogen functionality, etc. Additionally a framework can include ion conducting groups to improve ion transport from the catalyst to the ionomer. Such functionality can include, without limitation, sulfonic acid groups, oxygen containing groups, etc.

Figure 2:
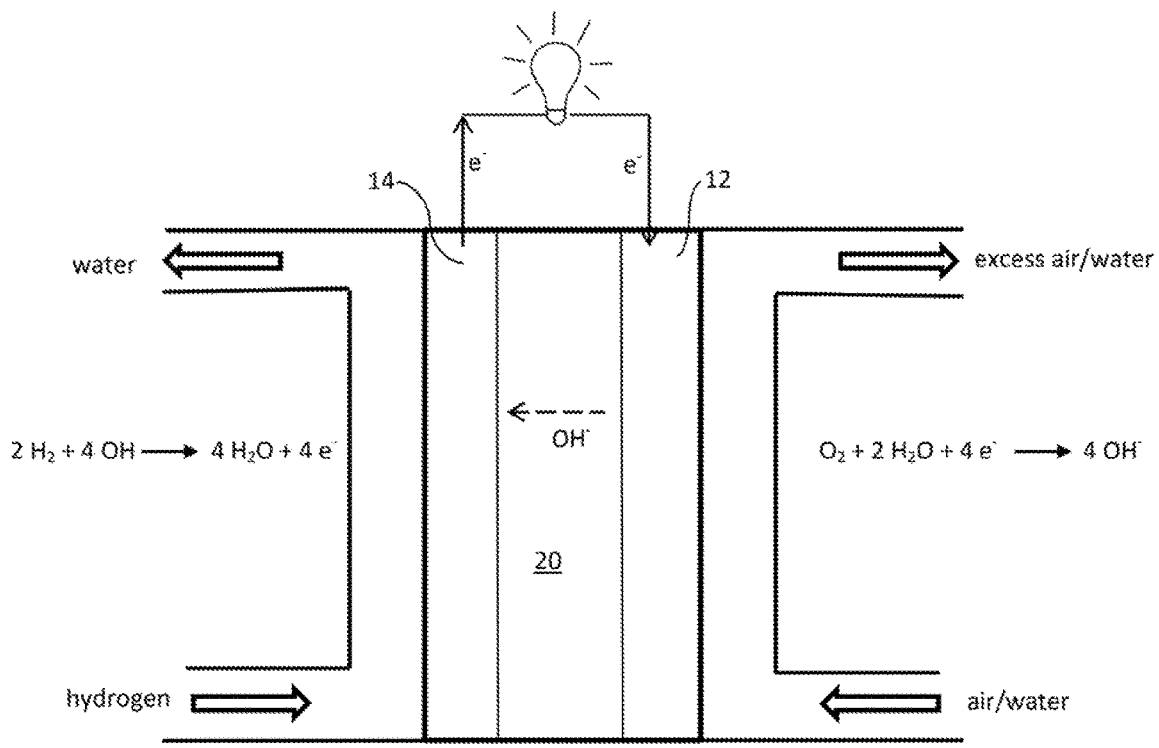
FIG. 2 schematically illustrates a hydroxyl-ion conducting fuel cell as may incorporate an ORR electrocatalyst as described herein.

The electrocatalyst can be utilized to catalyze the ORR in any of a variety of applications. The electrocatalysts can have particular efficacy in fuel cells requiring oxygen reduction reactions at an electrode to generate electric current. For example, the electrocatalysts can be used in direct methanol fuel cells, conventional hydrogen fuel cells and other electrochemical applications requiring an oxygen reducing electrode catalyst. By way of example, FIG. 1 and FIG. 2 schematically illustrate fuel cells as may incorporate the disclosed electrocatalysts. In particular, FIG. 1 illustrates a fuel cell that includes a proton conducting electrolyte 10 located between a cathode 12 and an anode 14, wherein the cathode 12 can include the oxygen reduction reaction electrocatalyst as described herein. FIG. 2 illustrates a fuel cell that includes a hydroxyl ion conducting electrolyte 20 located between the cathode 12 and anode 14. The half reactions of each electrode are also shown in the figures. In one particular embodiment, electrocatalysts as described herein can be located in ionic communication with either a proton or a hydroxyl ion-conducting electrolyte in formation of an environmentally friendly fuel cell.

The ORR active site can be located in electrical communication with the electrode current collector and in direct or indirect ionic communication with an electrolyte in any fashion. For instance, in one embodiment, the electrocatalyst can be based upon a CMP that is soluble and as such can be capable of being cast as a film and applied directly to an electrolyte layer. Examples of methods for forming soluble CMP's as may be utilized to form a film have been described, for instance in U.S. Pat. No. 8,519,090 to Amb, et al. and in U.S. Patent Application Publication No. 2015/0299380 to Cooper, et al., which are incorporated herein by reference.

In one embodiment, the electrocatalyst can be supported directly on an ionomeric support material. For example, the electrocatalyst can be applied as a powder (for instance in conjunction with a binder as an electrode ink) or as a film to the surface of an ionomeric substrate such as Nafion® (E. I. du Pont de Nemours, Wilmington, Del., USA) to form a catalytic layer for a fuel cell. An ionomeric membrane can function as the electrolyte of a fuel cell as further described below or optionally, an ionomeric membrane supporting the electrocatalyst can then be applied to an electrolyte material used in fuel cell manufacture.

In some embodiments, the electrocatalyst can be deposited directly on a solid electrolyte or on a support layer or a current collector in the form of a powder, for instance in conjunction with an electrode binder as is generally known in the art. Binders can include those as generally known in the art such as, and without limitation, poly-tetrafluoroethylene, polyurethane-based binders, elastic, rubber-based binders, polyvinyl alcohol-based binders, etc. For instance, the electrocatalyst can be combined in a powder form with an electrode binder in liquid form to form an electrode ink. The electrode ink can then be applied (e.g., spin casting, brush casting, etc.) to the solid electrolyte (or to a substrate or other intervening layer between the electrocatalyst and the electrolyte) according to standard processing techniques.

In some embodiments the cathode can include the ORR electrocatalyst mixed with one or more dissolved ionomers. The dissolved ionomer can be a dissolved ionic conductor including, for example, poly(perfluorosulphonic acid), such as Nafion®, Aciplex®, or Flemion®; sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly[(3-methylphenooxy) (phenoxy)phosphazene] and poly[bis(3-methylphenoxy)phosphazene]; and combinations thereof.

Any suitable electrically conductive current collector as is generally known in the art can be utilized in conjunction with the electrocatalysts. By way of example and without limitation, a current collector can be selected from graphite-based materials, stainless steel, aluminum, etc. may be utilized.

While the electrocatalyst can be utilized with any ion-conducing electrolyte material in fuel cell technology, the electrocatalysts can find particular utility in membrane electrode assemblies. Essentially, a membrane electrode fuel cell comprises an ion-conducting electrolyte membrane disposed between the electrodes such that the two electrodes are electrically isolated from one another. For instance, in a typical polymer electrolyte membrane fuel cell as shown in FIG. 1, ("PEM fuel cell") hydrogen fuel is introduced into the anode 14 where the hydrogen reacts at the active material of the anode and separates into protons and electrons. The electrolyte membrane 10 transports the protons to the cathode 12, while allowing a current of electrons to flow through an external circuit to the cathode 12 to provide power. Oxygen is introduced into the cathode 12 and reacts with the protons and electrons at the electrocatalyst of the cathode 12 to form water and heat. The reduction of the oxygen at the cathode can be catalyzed by the electrocatalysts produced by the methods described herein.

In one embodiment, the electrolyte membrane can be a commercially available electrolyte membrane, for example, Nafion® (poly(perfluorosulphonic acid), also commercially available as Aciplex® or Flemion®). Other ionomeric membrane materials known in the art, such as sulfonated styrene-ethylene-butylene-styrene; polystyrene-graft-poly(styrene sulfonic acid); poly(vinylidene fluoride)-graft-poly(styrene sulfonic acid); poly(arylene ether), such as poly(arylene ether ether ketone) and poly(arylene ether sulfone); polybenzimidazole; polyphosphazene, such as poly[(3-methylphenooxy) (phenoxy)phosphazene] and poly[bis(3-methylphenoxy)phosphazene]; and combinations thereof, may also be used.

In one embodiment the electrocatalysts can be utilized in an alkaline fuel cell. For instance, as shown in FIG. 2, the fuel cell can consume hydrogen and oxygen to produce water, heat and electricity. Alkaline fuel cells are well known and well developed, with efficiencies of up to about 70%, and as such, may be particularly well suited for use with the disclosed electrocatalysts. An alkaline fuel cell that incorporates an electrocatalyst as described herein can include a typical alkaline fuel cell electrolyte, such as a porous separator saturated with an aqueous alkaline solution (e.g., potassium hydroxide) and can encompass either a static electrolyte or a flowing electrolyte, as is known in the art, or a solid polymer electrolyte (e.g., membranes for alkaline fuel cells manufactured by Tokuyama Corporation). Moreover, a flowing electrolyte design can include either a transverse flow or a parallel flow, as desired. When considering a fuel cell that incorporates a liquid electrolyte such as an alkaline fuel cell, the fuel cell can include a suitable hydrophobic barrier layer that can prevent loss of electrolyte into the gas flow as is known.

An anode catalyst can be any suitable catalyst as is known in the art and can generally include at least one metal. For instance, the at least one metal can include platinum, ruthenium, palladium, and combinations thereof, that are known and used in the art as fuel cell anode materials. In one embodiment, the anode can be a non-platinum group metal catalyst and the fuel cell can be free of platinum group materials. The anode catalyst is typically deposited on an ionomeric membrane (e.g., either an ionomeric membrane electrolyte or a membrane support for the electrode) by preparing a catalyst ink containing the at least one metal and a suitable electrode binder and applying the ink to one side of the ionomeric membrane.

In some embodiments, the electrocatalyst may be coated on a gas diffusion media or gas diffusion layer for use in an electrochemical cell. A gas diffusion layer can typically include a carbon fiber or carbon paper substrate as is generally known in the art to allow for gas and water transport. A method can thus include applying an electrocatalyst as described on at least a portion of a gas diffusion layer. The electrocatalyst can be applied to the gas diffusion layer using typical methodology, such as by formation of a catalyst ink, as described above.

The electrocatalysts described herein can decrease the cost of products such as fuel cell systems that incorporate the materials not only through reduction or elimination of precious metals used in the systems, but also through the ability to form the materials with lower energy consumption. As such, the electrocatalysts can provide great benefit to the art.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming an electrocatalytic structure comprising:
    forming an electrocatalyst, the method for forming the electrocatalyst including
        reacting monomers in a melt at a reaction temperature, the melt comprising the monomers, a solvent, and a catalyst, wherein the catalyst and the solvent are a Lewis acid, the Lewis acid having a melting point below the reaction temperature, the Lewis acid being based on main group metals, early d-block metals, or late d-block metals, the reaction forming a three dimensional polymeric framework, the monomers including at least one π-conjugated moiety, the reaction forming linkages between individual monomers, at least a portion of the monomers and/or linkages providing at least one multidentate chelating site comprising multiple heteroaryl nitrogen atoms; and
        complexing a metal ion within the framework at the chelating site via formation of coordinate bonds between the metal ion and the multiple heteroaryl nitrogen atoms of the chelating site, the metal ion comprising a non-platinum group metal capable of use as an active site in an oxygen reduction reaction.

2. The method of claim 1, wherein the reaction is an ionothermal synthesis.

3. The method of claim 1, the linkages comprising at least one heteroaryl group comprising phenazine ring linkages formed via a phenazine ring fusion reaction.

4. The method of claim 1, the linkages comprising at least one heteroaryl group comprising triazine linkages formed via a cyano cyclotrimerization reaction.

5. The method of claim 1, the linkages comprising an aryl group comprising benzene linkages formed via an alkynyl cyclotrimerization reaction.

6. The method of claim 1, wherein at least a portion of the monomers comprises multiple heteroaryl nitrogen atoms, each of these heteroaryl nitrogen atoms being configured to form coordinate bonds with a metal ion such that these monomers provide at least one multidentate chelating site.

7. The method of claim 1, the metal ion comprising a 3-d transition metal.

8. The method of claim 1, wherein the reaction temperature is about 400° C. or less.

9. The method of claim 1, further comprising combining the electrocatalyst with an electrode binder.

10. The method of claim 1, further comprising locating the electrocatalyst in ionic communication with an ion-conducting electrolyte.

11. The method of claim 1, further comprising locating the electrocatalyst in electrical communication with an electrode current collector.

12. The method of claim 1, the non-platinum group metal comprising iron, cobalt, copper, nickel, chromium, manganese, or combinations thereof.

13. The method of claim 10, further comprising locating the ion-conducting electrolyte in ionic communication with an electrode, the ion-conducting electrolyte electrically isolating the electrode and the electrocatalyst.

14. The method of claim 10, wherein the ion-conducting electrolyte is a proton-conducting electrolyte or a hydroxyl ion-conducting electrolyte.

15. The method of claim 10, wherein the ion conducting electrolyte comprises an ion-conducting membrane.

16. The method of claim 1, wherein the reaction temperature is about 300° C. or less.

17. The method of claim 1, wherein the Lewis acid is based on aluminum, boron, silicon, tin, titanium, zirconium, iron, copper, or zinc.

18. The method of claim 1, wherein the Lewis acid comprises zinc chloride, iron chloride, or aluminum chloride.

19. A method for forming an electrocatalytic structure comprising:
    forming an electrocatalyst, the method for forming the electrocatalyst including
        reacting monomers in a melt in the presence of a Lewis acid catalyst to form a three dimensional polymeric framework, the monomers including at least one π-conjugated moiety, the reaction forming linkages between individual monomers, at least a portion of the monomers and/or linkages providing at least one multidentate chelating site comprising multiple heteroaryl nitrogen atoms; and
        complexing a metal ion within the framework at the chelating site via formation of coordinate bonds between the metal ion and the multiple heteroaryl nitrogen atoms of the chelating site, the metal ion comprising a non-platinum group metal capable of use as an active site in an oxygen reduction reaction; wherein
    the reaction temperature is about 300° C. or less.

20. The method of claim 19, the linkages comprising phenazine ring linkages, triazine linkages or benzene linkages.

21. The method of claim 19, the non-platinum group metal comprising iron, cobalt, copper, nickel, chromium, manganese, or combinations thereof.

22. The method of claim 19, further comprising combining the electrocatalyst with an electrode binder.

23. The method of claim 19, further comprising locating the electrocatalyst in ionic communication with an ion-conducting electrolyte.

24. The method of claim 19, further comprising locating the electrocatalyst in electrical communication with an electrode current collector.

* * * * *